United States Patent
Shiota et al.

(10) Patent No.: US 7,663,643 B2
(45) Date of Patent: Feb. 16, 2010

(54) ELECTRONIC ALBUM DISPLAY SYSTEM, AN ELECTRONIC ALBUM DISPLAY METHOD, AND A MACHINE READABLE MEDIUM STORING THEREON A COMPUTER PROGRAM FOR DISPLAYING AN ELECTRONIC ALBUM

(75) Inventors: Kazuo Shiota, Tokyo (JP); Shuichi Ohtsuka, Kanagawa (JP); Kazuki Nakajima, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 702 days.

(21) Appl. No.: 11/222,817

(22) Filed: Sep. 12, 2005

(65) Prior Publication Data

US 2006/0055977 A1 Mar. 16, 2006

(30) Foreign Application Priority Data

Sep. 10, 2004 (JP) .............................. 2004-264552

(51) Int. Cl.
*G09G 5/00* (2006.01)
(52) U.S. Cl. ...................... 345/619; 345/418; 345/620; 345/660
(58) Field of Classification Search ................. 345/418, 345/619, 620, 660
See application file for complete search history.

(56) References Cited

U.S. PATENT DOCUMENTS

| | | | |
|---|---|---|---|
| 6,847,379 B2 * | 1/2005 | Grosvenor et al. | 345/619 |
| 2003/0052897 A1 * | 3/2003 | Lin | 345/619 |
| 2005/0012758 A1 * | 1/2005 | Christou | 345/619 |
| 2005/0105803 A1 * | 5/2005 | Ray | 382/209 |
| 2005/0105806 A1 * | 5/2005 | Nagaoka et al. | 382/224 |
| 2006/0055825 A1 * | 3/2006 | Shiota et al. | 348/563 |
| 2006/0221779 A1 * | 10/2006 | Matsushita et al. | 369/30.01 |
| 2008/0062141 A1 * | 3/2008 | Chandhri | 345/173 |
| 2008/0089590 A1 * | 4/2008 | Isomura et al. | 382/217 |

FOREIGN PATENT DOCUMENTS

JP 10-162020 A 6/1998

OTHER PUBLICATIONS

Andreas Girgensohn et al., "Leveraging Face Recognition Technology to Find and Organize Photos", Oct. 2004, p. 1-8.*
Steven Drucker et al., "MediaBrowser: Reclaiming the Shoebox", p. 433-436, 2004.*

* cited by examiner

*Primary Examiner*—M Good Johnson
(74) *Attorney, Agent, or Firm*—Sughrue Mion, PLLC (57) ABSTRACT

An electronic album display system for displaying a plurality of images included in an electronic album having an image storing unit for classifying each of the plurality of images into a plurality of groups and storing each image, an image selecting unit for selecting an image to be displayed, an image display unit for displaying the image selected, an operation unit for receiving a display operation for said image display unit controlled by a viewer when one image is being displayed, an interest detecting unit for detecting an interest of the viewer in the one image on the basis of the display operation received by the operation unit, and an interest storing unit for storing the interest for each of the plurality of images, wherein the image selecting unit selects an image classified in a group including an image in which the viewer has an interest based on the interest stored in said interest storing unit.

18 Claims, 10 Drawing Sheets

| PERSON IDENTIFIER | FACE IMAGE |
|---|---|
| 0 |  |
| 1 |  |
| 2 |  |
| ⋮ | ⋮ |

FIG. 3

| IMAGE | PERSON IDENTIFIER |
|---|---|
|  | 0, 1 |
|  | 2, 3, 4 |
|  | 0, 3 |
| ⋮ | ⋮ |

FIG. 4

| GROUP | COMBINATION OF PERSONS | IMAGE | |
| --- | --- | --- | --- |
| | | IMAGE IDENTIFIER | IMAGE DATA |
| GROUP 500 | 0, 1 | 100 |  |
| | | 101 |  |
| | | ⋮ | ⋮ |
| GROUP 510 | 2, 3, 4 | 200 |  |
| | | 201 |  |
| | | ⋮ | ⋮ |
| ⋮ | ⋮ | ⋮ | ⋮ |

| VIEWER | IMAGE IDENTIFIER | INTEREST |
|---|---|---|
|  | 100 | 5 |
| | 201 | 3 |
| | ⋮ | ⋮ |
|  | 310 | 10 |
| | 102 | 1 |
| | ⋮ | ⋮ |
| ⋮ | ⋮ | ⋮ |

FIG. 10

ELECTRONIC ALBUM DISPLAY SYSTEM, AN ELECTRONIC ALBUM DISPLAY METHOD, AND A MACHINE READABLE MEDIUM STORING THEREON A COMPUTER PROGRAM FOR DISPLAYING AN ELECTRONIC ALBUM

BACKGROUND OF THE INVENTION

1. Field of the Invention

The present invention relates to an electronic album display system, an electronic album display method, and a machine readable medium storing thereon a computer program for displaying an electronic album. More particularly, the present invention relates to an electronic album display system, an electronic album display method, and a machine readable medium storing thereon a computer program for displaying a plurality of images included in an electronic album.

2. Related Art

Conventionally, a display method for classifying a plurality of images into a plurality of groups, displaying a sample image of each group, and displaying a sample image of a subgroup of a group to which a sample image selected by a user belongs and an image with a feature similar with that of the selected sample image is known as a method for displaying a plurality of images as disclosed, or example, in Japanese Patent Application Laid-Open No. 1998-16202.

However, the display method disclosed in the above patent document requires a viewer to select a sample image similar with an image which he/she wants to appreciate out of sample images which he/she has taken a look at. Thus, as the number of groups into which the images are classified increases, working of the viewer understanding a subject matter of each of the sample images and selecting an image increases. Thus, there is a problem that a heavy burden is imposed on the viewer and it is difficult for the viewer to select an image which he/she wants to appreciate correctly.

SUMMARY OF THE INVENTION

Therefore, it is an object of the present invention to provide an electronic album display system, an electronic album display method, and a machine readable medium storing thereon a computer program for displaying an electronic album, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, an electronic album display system for displaying a plurality of images included in an electronic album, includes: an image storing unit for classifying each of the plurality of images into a plurality of groups and storing the image; an image selecting unit for selecting an image to be displayed out of the plurality of images; an image display unit for displaying the image selected by the image selecting unit; an operation unit for receiving an operation from a viewer when one image included in the plurality of images is being displayed by the image display unit; an interest detecting unit for detecting an interest of the viewer in the one image on the basis of the operation received by the operation unit; and an interest storing unit for storing the interest for each of the plurality of images, and the image selecting unit selects an image classified as a group including an image in which the viewer has a greater interest out of the plurality of images more frequently as the image to be displayed by the image display unit.

The operation unit may receive a display time setting operation for setting display time during which the one image is displayed by the image display unit, and the interest detecting unit may detect a greater interest for an image of which display time is set longer by the display time setting operation out of the plurality of images. The operation unit receives an image selecting operation for selecting the one image, and the interest detecting unit may detect a greater interest for an image selected more frequently by the image selecting operation out of the plurality of images. The electronic album display system may further include an image capturing unit for capturing a face image of the viewer, and the interest storing unit may store an interest in each of the plurality of images for each viewer.

The electronic album display system may further include a face image database for storing face images of a plurality of persons, and an image classifying unit for grouping each of the plurality of images by the kind of combination of a plurality of persons included in the image on the basis of each of the face images stored in the face image database and making the image stored in the image storing unit. The operation unit may receive a person selecting operation for selecting at least a part of persons included in the one image, and the interest detecting unit may detect a greater interest for an image classified as a group of the kind of combination of persons including a person selected more frequently by the person selecting operation out of the plurality of images. Even in case a first image and a second image included in the plurality of images are different in the combination of persons, the image classifying unit may classify the first and second images as the same group if at least one of image capturing time and image capturing place of the first image shows a difference smaller than a predetermined reference value from that of the second image.

According to the second aspect of the present invention, an electronic album display method for displaying a plurality of images included in an electronic album is provided, wherein an image storing unit classifies each of the plurality of images into a plurality of groups and stores the image, the electronic album display method includes: an image selecting step of selecting an image to be displayed out of the plurality of images; an image display step of an image display unit displaying the image selected in the image selecting step; an operation step of receiving an operation from a viewer when one image included in the plurality of images is being displayed by the image display unit; an interest detecting step of detecting an interest of the viewer in the one image on the basis of the operation received in the operation step; and an interest storing step of storing the interest for each of the plurality of images, and, in the image selecting step, an image classified as a group including an image in which the viewer has a greater interest is selected more frequently as the image to be displayed in the image display step out of the plurality of images.

According to the third aspect of the present invention, a machine readable medium storing thereon a computer program which makes a computer function as an electronic album display system for displaying a plurality of images included in an electronic album is provided, wherein the computer includes: an image storing unit for classifying each of the plurality of images into a plurality of groups and storing the image; an image selecting unit for selecting an image to be displayed out of the plurality of images; an image display unit for displaying the image selected by the image selecting unit; an operation unit for receiving an operation from a viewer when one image included in the plurality of images is being displayed by the image display unit; an interest detecting unit for detecting an interest of the viewer in the one image on the basis of the operation received by the operation unit; and an interest storing unit for storing the interest for each of the plurality of images, and the image selecting unit selects an image classified as a group including an image in which the viewer has a greater interest out of the plurality of images more frequently as the image to be displayed by the image display unit.

The summary of the invention does not necessarily describe all necessary features of the present invention. The present invention may also be a sub-combination of the features described above.

According to the present invention, it is possible to select and display an image which a viewer wants to enjoy viewing automatically and correctly.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
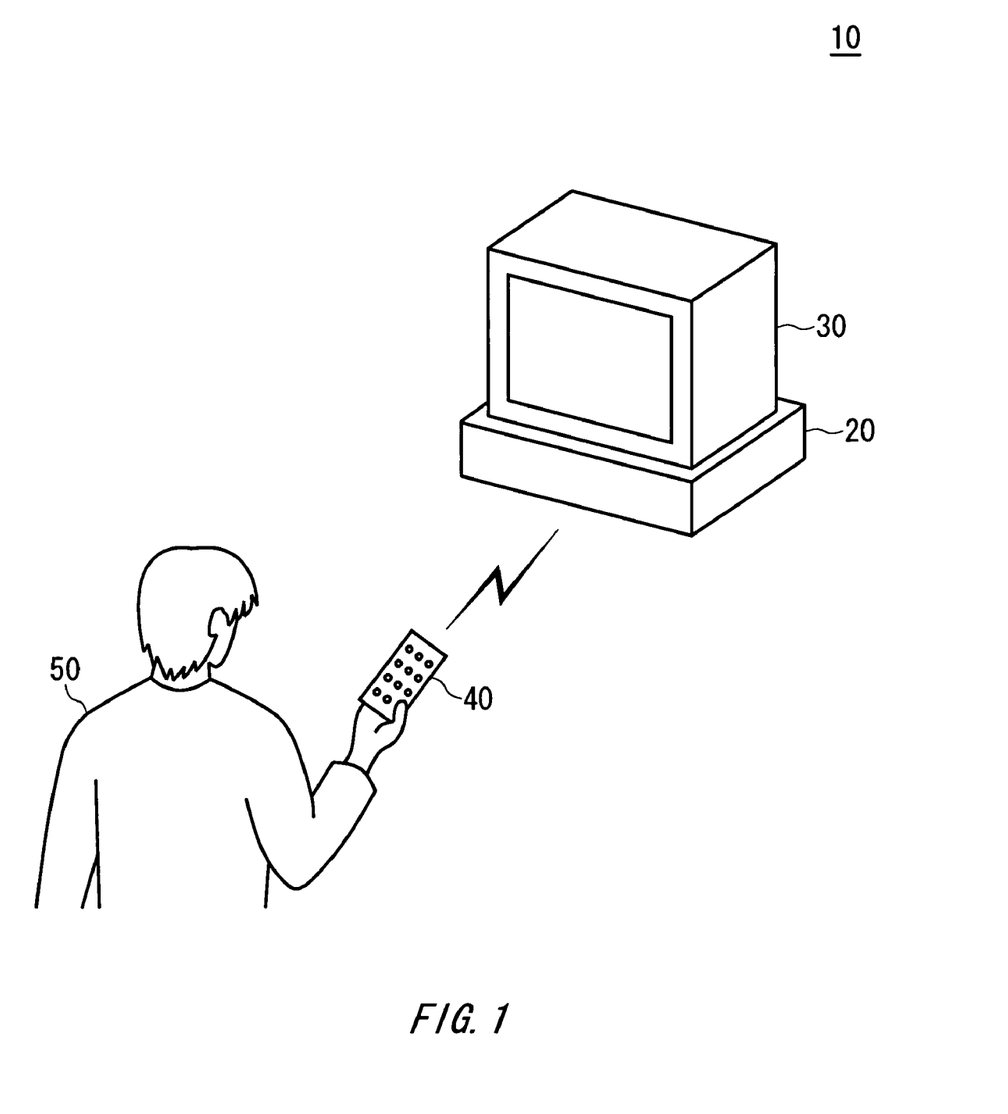
FIG. 1 shows an example of an electronic album display system 10 according to an embodiment of the present invention.

FIG. 1 shows an example of an electronic album display system 10 according to an embodiment of the present invention. The electronic album display system 10 includes an electronic album reproducing unit 20, an image display unit 30, and an operation unit 40, and displays a plurality of images included in an electronic album to make a viewer 50 appreciate the images. For example, the electronic album display system 10 may switch the plurality of images at a predetermined time interval to display the images successively as the so called slide-show.

The electronic album reproducing unit 20 stores the plurality of images included in the electronic album. Here, the image may be a still picture or a moving picture. Further, the electronic album reproducing unit 20 selects an image which should be displayed out of the plurality of images, reproduces the selected image as an image signal, and output it to the image display unit 30. Further, the electronic album reproducing unit 20 may be a video reproducing device, such as, for example, a DVD player which can reproduce a still picture or a moving picture. The image display unit 30 may be a television receiver, for example. The image display unit 30 receives the image signal showing the image selected by the electronic album reproducing unit 20 and displays it. In case one image out of the plurality of images included in the electronic album is displayed by the image display unit, the operation unit 40 is operated by the viewer 50. Here, the operation of the viewer 50 may be an operation of changing an image display method of the image display unit 30, that is, an image reproducing method of the electronic album reproducing unit 20, for example. Further, the operation unit 40 may be a remote controller performing communication with the electronic album reproducing unit 20 by using a wireless communication technique such as infrared ray communication, Bluetooth (registered trademark), wireless LAN, etc.

Further, although the electronic album display system 10 according to the present example includes the electronic album reproducing unit 20, the image display unit 30, and the operation unit 40 separately, the electronic album display system 10 may include a module which is a combination of at least a part of the electronic album reproducing unit 20, the image display unit 30, and the operation unit 40, such as, a personal computer and a video reproducing device with an operation panel.

The electronic album display system 10 according to the embodiment of the present invention does not display all the images included in the electronic album, and, in case of selecting and displaying only a part of the images, can select and display an image which the viewer 50 wants to appreciate correctly and automatically by detecting an interest of the viewer 50 in each image on the basis of the operation of the viewer 50 when the images were displayed previously.

Figure 2:
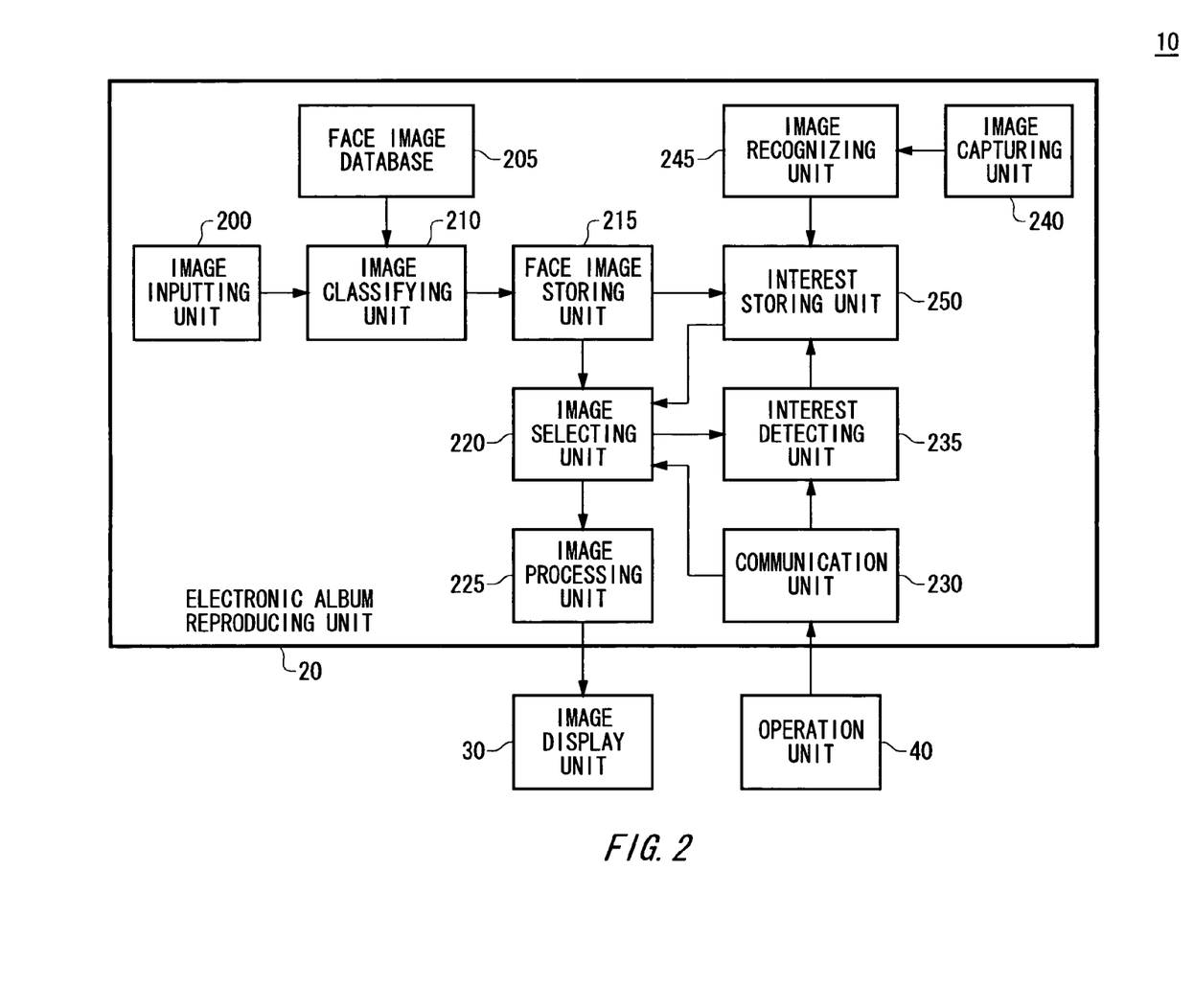
FIG. 2 is a block diagram showing an example of a functional configuration of the electronic album display system 10 according to the embodiment of the present invention.

FIG. 2 is a block diagram showing an example of a functional configuration of the electronic album display system 10 according to the embodiment of the present invention. The electronic album reproducing unit 20 includes an image inputting unit 200, a face image database 205, an image classifying unit 210, an image storing unit 215, an image selecting unit 220, an image processing unit 225, a communication unit 230, an interest detecting unit 235, an image capturing unit 240, an image recognizing unit 245, and an interest storing unit 250. A plurality of images which should be included in the electronic album are input to the image inputting unit 200 from the outside of the electronic album reproducing unit 20, for example, via a memory card using a flash memory, a network, etc. Then, the image inputting unit 200 outputs the input plurality of images to the image classifying unit 210. The face image database 205 stores face images of a plurality of persons.

The image classifying unit 210 classifies each of the plurality of images which should be included in the electronic album and which are received from the image inputting unit 200 into a plurality of groups so that images which have high relevancy to each other are classified as the same group and makes the plurality of images stored in the image storing unit 215. Specifically, the image classifying unit 210 identifies a plurality of persons included in each of the plurality of images on the basis of each of the face images stored in the face image database 205. Then, the image classifying unit 210 groups each of the received plurality of images by the kind of combination of a plurality of persons included in the image and makes stored the images in the image storing unit 215. The image storing unit 215 classifies each of the plurality of images included in the electronic album into a plurality of groups and stores the images.

The image selecting unit 220 selects out of the plurality of images included in the image storing unit 215 and selects an image to be displayed by the image display unit 30. The image selecting unit 220 outputs the selected image to the image processing unit 225. Further, the image selecting unit 220 outputs the selected image to the interest detecting unit 235. The image processing unit 225 performs an image processing on the image selected by the image selecting unit 220 and to be displayed by the image display unit 30. Here, the image processing may be an extension processing of JPEG (Joint Photographic Experts Group), a processing of converting to a video signal such as NTSC, PAL, etc., a modification processing, an effect processing, or a processing of overlapping another image. Then, the image processing unit 225 outputs the image on which the image processing is performed to the image display unit 30. Then, the image display unit 30 displays the image received from the image processing unit to make the viewer 50 appreciate it.

The communication unit 230 communicates with the operation unit 40 by using a wireless communication technique. Specifically, the communication unit 230 outputs information showing the operation of the operation unit 40 by the viewer 50 to the image selecting unit 220 and the interest detecting unit 235. The interest detecting unit 235 detects an interest of the viewer 50 in an image which is selected by the image selecting unit 220 and is being displayed by the image display unit 30 on the basis of the operation of the operation unit 40 by the viewer 50. Then, the interest detecting unit 235 outputs information showing the image which is being displayed and the detected interest to the interest storing unit 250.

The image capturing unit 240 is, for example, a digital camera provided in the electronic album reproducing unit 20, and captures a face image of the viewer 50. Then, the image capturing unit 240 outputs the captured face image of the viewer 50 outputs to the image recognizing unit 245. The image recognizing unit 245 detects an image showing the face of the viewer 50 from the captured image by performing a known image recognition processing on the face image of the viewer 50 received from the image capturing unit 240 and extracts a feature of the face image of the viewer 50. Then, the image recognizing unit 245 outputs the extracted feature to the interest storing unit 250. The interest storing unit 250 receives the interest of the viewer 50 in each image of the plurality of images stored in the image storing unit 215 from the interest detecting unit 235 and stores it. Here, the interest storing unit 250 may store an interest in each of the plurality of images for each viewer 50 by identifying the viewer 50 on the basis of the feature of the face image of the viewer 50 received from the image recognizing unit 245.

Further, the image selecting unit 220 selects an image stored in the interest storing unit 250 and classified as a group including images in which the viewer has an interest as an image which should be displayed by the image display unit 30 with higher frequency, out of the plurality of images which are classified into a plurality of groups by the image storing unit 215.

According to the electronic album display system 10 of the embodiment of the present invention, it is possible to detect an interest of the viewer 50 in each of images of the electronic album on the basis of the operation by the viewer 50 when the images were displayed. Then, in case of displaying the images of the electronic album next, it is possible to select and display not only an image in which the viewer 50 has showed a great interest but also an image which has high relevancy to the image, that is, an image having the combination of persons which is the same as that of the image. Therefore, the viewer 50 can make the electronic album display system 10 automatically select an image which he/she wants to appreciate out of the plurality of images included in the electronic album and display it only by controlling display operation when the images were previously displayed.

Figure 3:
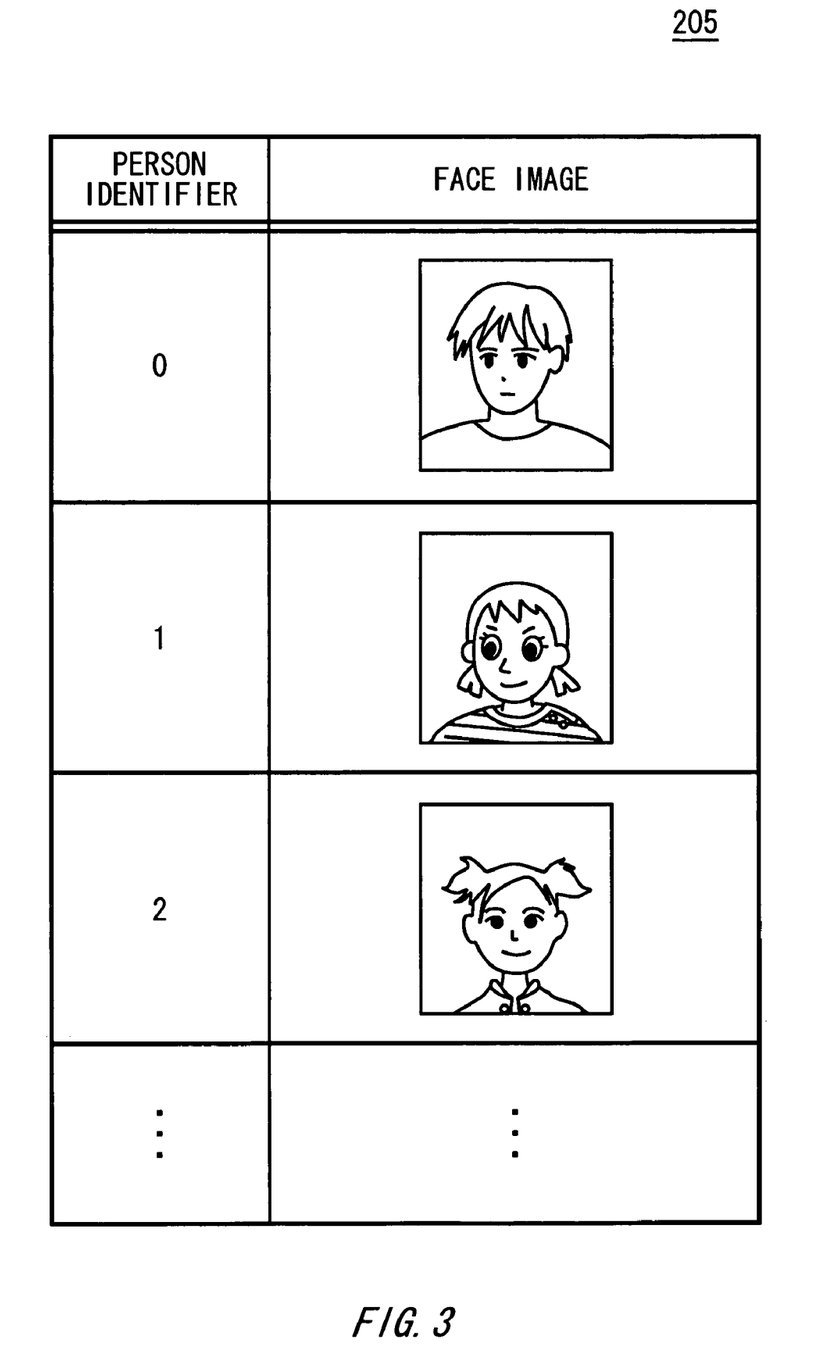
FIG. 3 shows an example of a face image database 205 according to the embodiment of the present invention.

FIG. 3 shows an example of the face image database 205 according to the embodiment of the present invention. For each of a plurality of persons, the face image database 205 stores a person identifier for identifying the person and a face image of the person so that they corresponds to each other. Here, the person identifier may be a value which is uniquely determined for each face image when the face image is stored.

Figure 4:
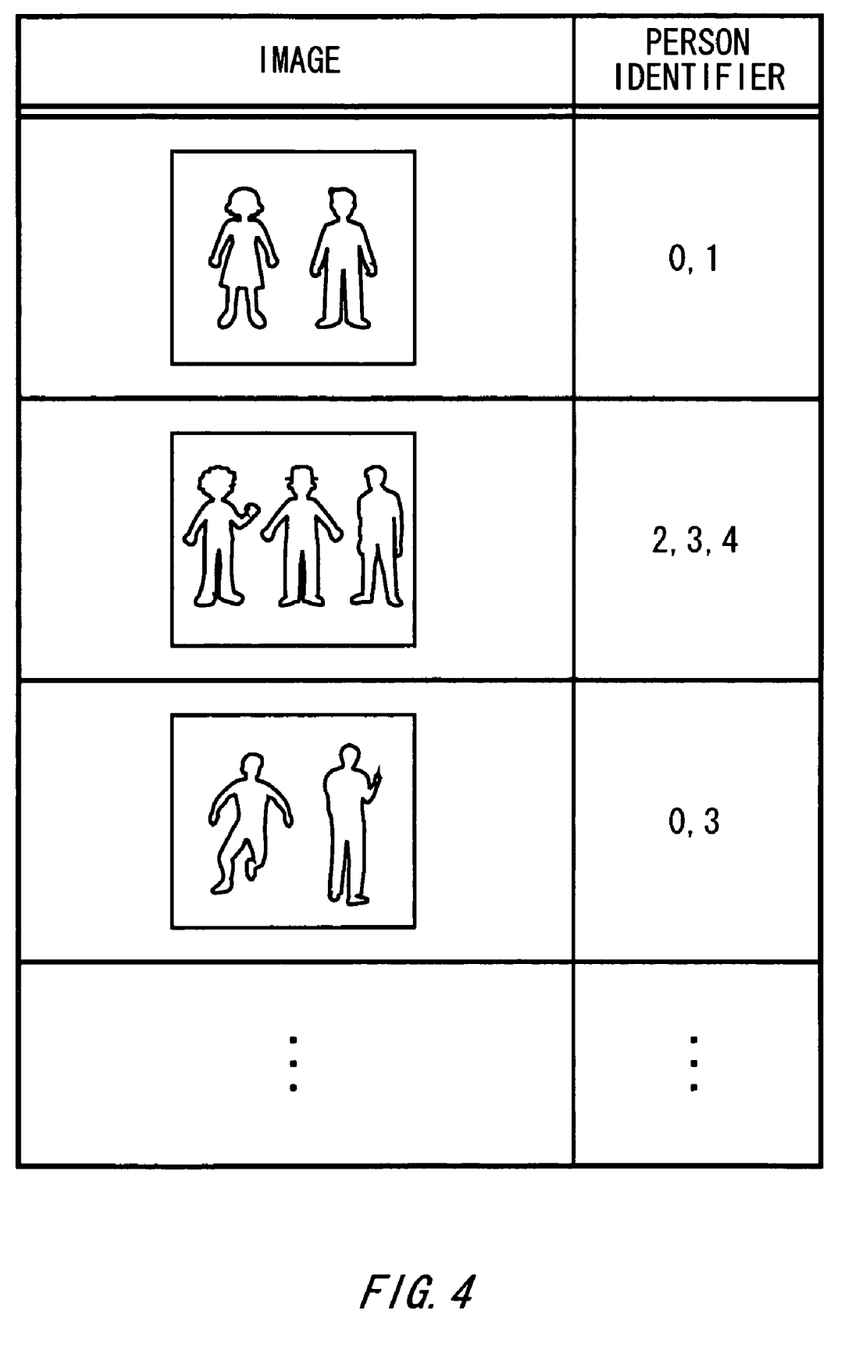
FIG. 4 shows an example of a person recognition result of an image classifying unit 210 according to the embodiment of the present invention.

FIG. 4 shows an example of the person recognition result of the image classifying unit 210 according to the embodiment of the present invention. For example, for each of the plurality of images received from the image inputting unit 200, the image classifying unit 210 detects a plurality of objects included in the image by performing a known image processing such as a contour extraction processing, a color distribution analysis processing, etc. Then, the image classifying unit 210 detects unique features of a person's face from an image showing each of the detected objects, and thus, in case the object is a person, detects a partial image showing the face from an image showing the object. Then, the image classifying unit 210 identifies each of a plurality of persons included in each of the images received from the image inputting unit 200 by comparing the detected partial image showing the person's face with each of the plurality of face images stored in the face image database 205 shown in FIG. 3. Thus, for each of the received plurality of images, the image classifying unit 210 detects a plurality of person identifiers showing a plurality of persons included in the image as shown in FIG. 4. Then, the image classifying unit 210 classifies each of the received plurality of images into a plurality of groups so that images having the same combination of persons are classified as the same group and makes them stored in the image storing unit 215.

Further, even in case a first image and a second image included in the plurality of images received from the image inputting unit 200 are different in the combination of persons, the image classifying unit 210 may classify the first and second images as the same group if at least one of image capturing time and image capturing place of the first image shows a difference smaller than a predetermined reference value from that of the second image. Here, the predetermined reference value may be the maximum value of the difference in image capturing time or image capturing place between the first and second images when determined that the first and second images include the same person and a person locating around image capturing place is the same for the first and second images in which case such the first and second images are captured during the same event, for example, a trip, or be predetermined by the viewer 50, for example, as one (1) day and 10 km.

Further, the image classifying unit 210 may set a combination of persons of a group, which the first and second images are classified as, to the combination including both the combination of persons of the first image and that of the second image. For example, in case the combination of persons of the first image is detected as zero (0) and one (1) (here, zero and one are person identifiers) and the combination of persons of the first image is detected as zero (0) and three (3), the image classifying unit 210 may set a combination of persons of a group, which the first and second images are classified as, to zero (0), one (1), and three (3).

For example, in case a plurality of persons make a trip and images are captured, sometimes an image includes all the persons but another image includes only a part of the persons. In this case, if each image is classified exactly on the basis of the combination of persons included in the image, sometimes a series of images captured during the trip are classified into a plurality of groups. However, according to the electronic album display system 10 of the embodiment of the present invention, it is possible to classify a series of images as the same group if the images show differences in at least one of image capturing time and image capturing place smaller than a predetermined reference value as such a case that the images are captured during a trip. Therefore, in case the viewer 50 has a great interest in a part of the images captured during the trip, it is possible to display an image classified as the same group as the images in which the viewer 50 has a great interest and having high relevancy to the images.

Further, although the image classifying unit 210 classifies each of the plurality of images received from the image inputting unit 200 on the basis of a person's face image, it may classify each of the plurality of images by using another method. For example, the image classifying unit 210 may classify each of the plurality of images on the basis of a feature vector which is unique for every kind of objects, such as, a person, a flower, an insect, etc. Further, the image classifying unit 210 may classify each of the plurality of images into a plurality of groups on the basis of the kind of object or a combination of the kinds of objects. Further, for example, the image classifying unit 210 may classify each of the plurality of images into a plurality of groups on the basis of unique information of an image such as image capturing time, image capturing place, etc.

Further, in case of classifying each of the plurality of images received from the image inputting unit into a plurality of groups, the image classifying unit 210 may classify the plurality of images by storing an image file showing each image in a directory corresponding to each group. Instead, the image classifying unit 210 may classify each of the plurality of images by recording information showing classification such as person recognition result, a combination of persons, the kind of object, image capturing time, image capturing place, etc., on an image file showing the image as tag information based on Exif (Exchangeable image file) format and the like.

Figure 5:
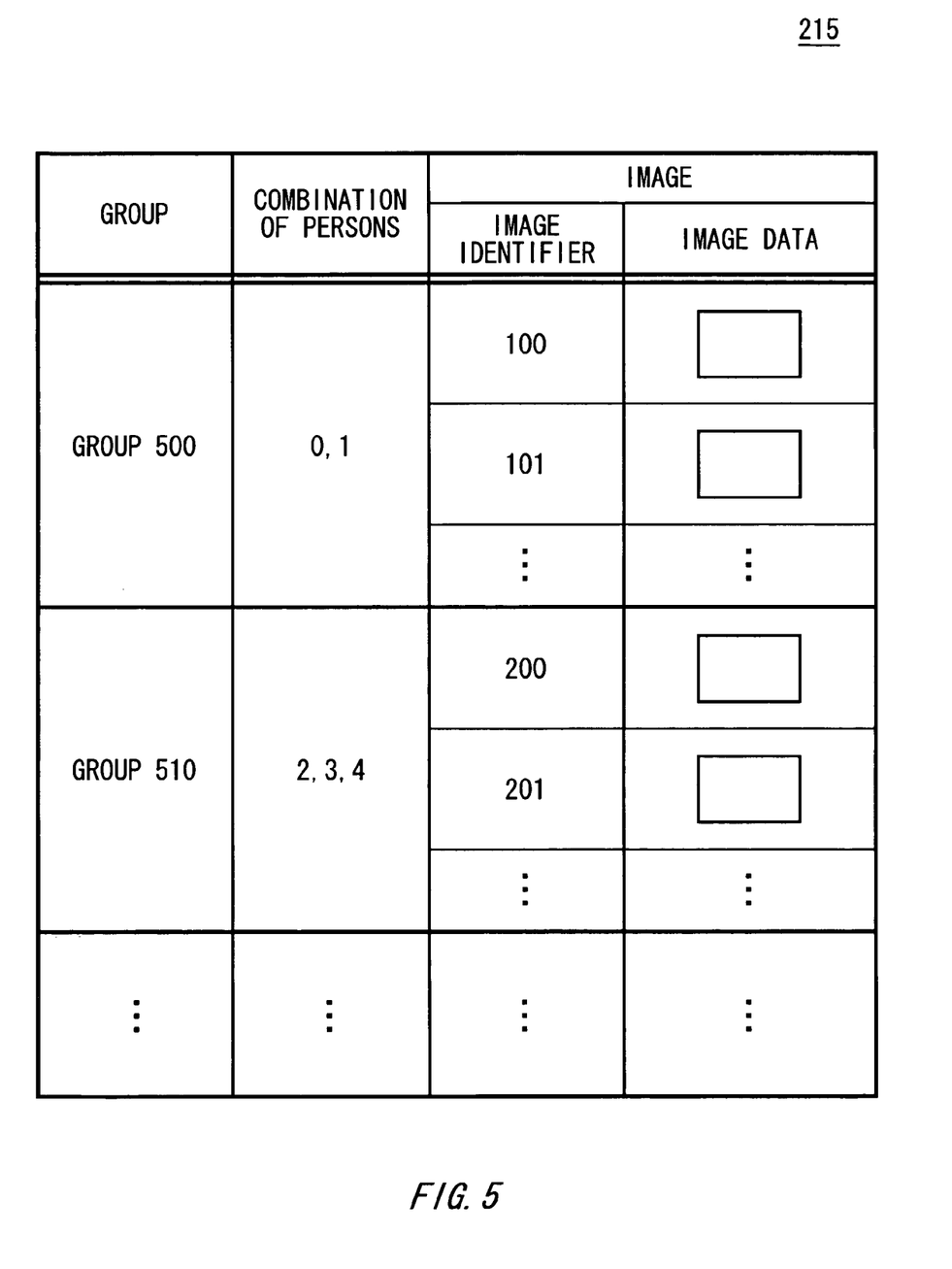
FIG. 5 shows an example of an image storing unit 215 according to the embodiment of the present invention.

FIG. 5 shows an example of the image storing unit 215 according to the embodiment of the present invention. The image storing unit 215 classifies each of the plurality of images included in the electronic album into a plurality of groups (500, 510, . . . ) and stores them. Then, the image storing unit 215 stores a plurality of person identifiers detected by the image classifying unit 210 each of which corresponds to each group and shows the combination of persons of the group. Further, the image storing unit 215 stores information showing an image corresponding to each group. Here, the information showing an image may include image data showing the image and an image identifier for identifying the image data. Further, in case the image storing unit 215 receives images from the image classifying unit 210 and stores them, the image identifier may be a value determined uniquely for each of the images. As above, the image storing unit 215 classifies each of the plurality of images included in the electronic album into a plurality of groups by the kind of combination of persons included in each of the images and stores them.

According to the electronic album display system 10 of the embodiment of the present invention, it is possible to group images by a combination of persons included in each of the images. By this, it is possible to select and display not only an image in which the viewer 50 has a great interest but also an image which has high relevancy to the image, that is, an image having the combination of persons which is the same as that of the image.

Figure 6:
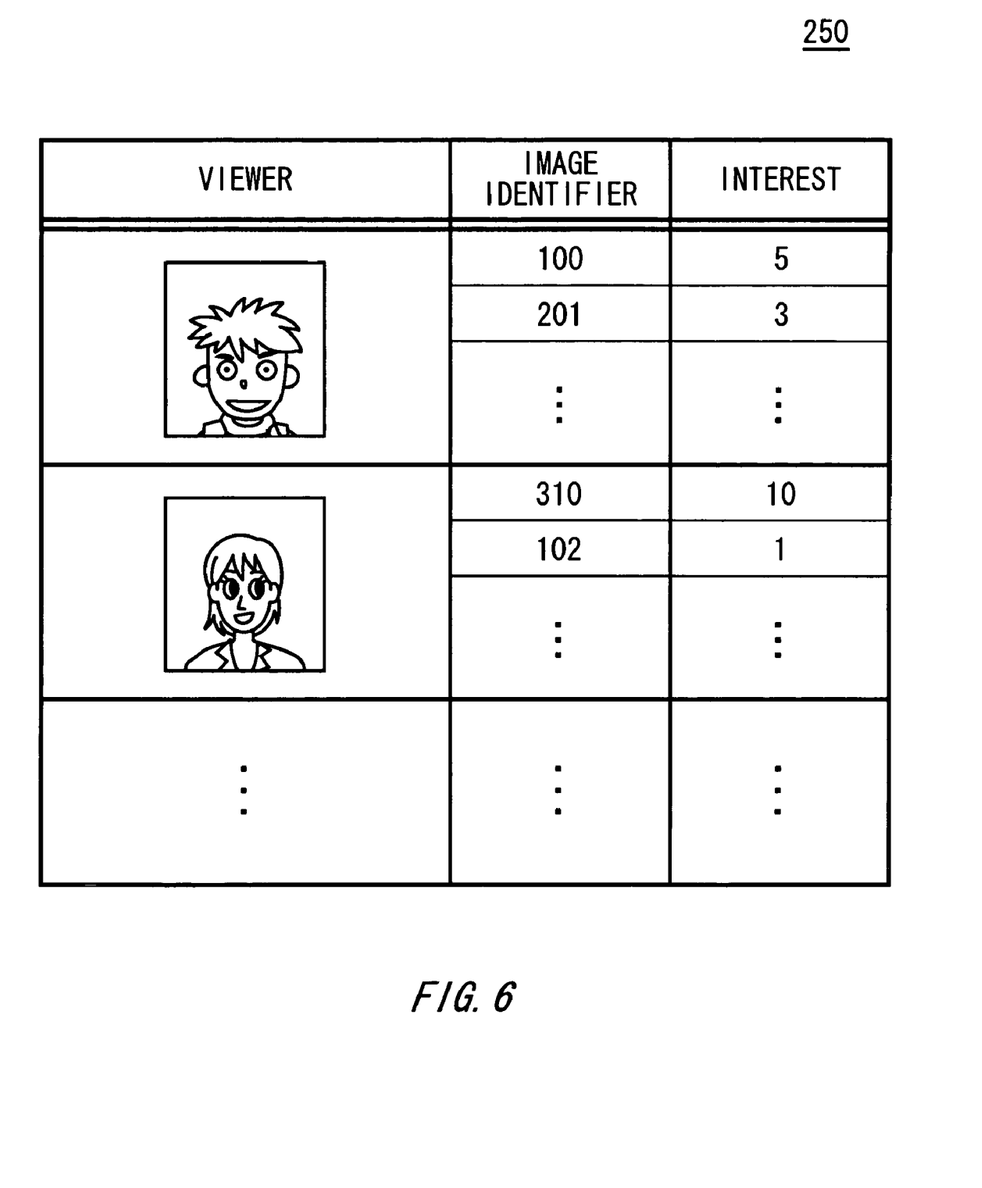
FIG. 6 shows an example of an interest storing unit 250 according to the embodiment of the present invention.

FIG. 6 shows an example of the interest storing unit 250 according to the embodiment of the present invention. The interest storing unit 250 stores information showing each of a plurality of viewers 50, for example, a feature of a face image of the viewer 50. Further, the interest storing unit 250 stores an image identifier for identifying each of the images stored in the image storing unit 215 and an interest of the viewer 50 in the image which correspond to the information showing each viewer 50. Here, the interest storing unit 250 may store an interest in all the images stored in the image storing unit 215 or only an interest in a part of the images for each viewer 50. Further, in case of storing only interest in a part of the images, interest of the viewer 50 in other images stored in the image storing unit 215 may be a predetermined standard value. Further, according to the present example, the larger an interest stored in the interest storing unit 250 is, the more interested the viewer 50 is in the image corresponding to the interest.

According to the electronic album display system 10 of the embodiment of the present invention, in case a plurality of viewers 50 views an electronic album, it is possible to display an image which any viewer 50 wants to appreciate to the viewer 50 by storing an interest of each viewer 50. Further, by storing an interest of each viewer 50 on the basis of a captured face image of the viewer 50, it is possible for the viewer 50 to view an image which he/she wants to appreciate without recording information on himself/herself on the electronic album display system 10 or carrying out login process.

Figure 7:
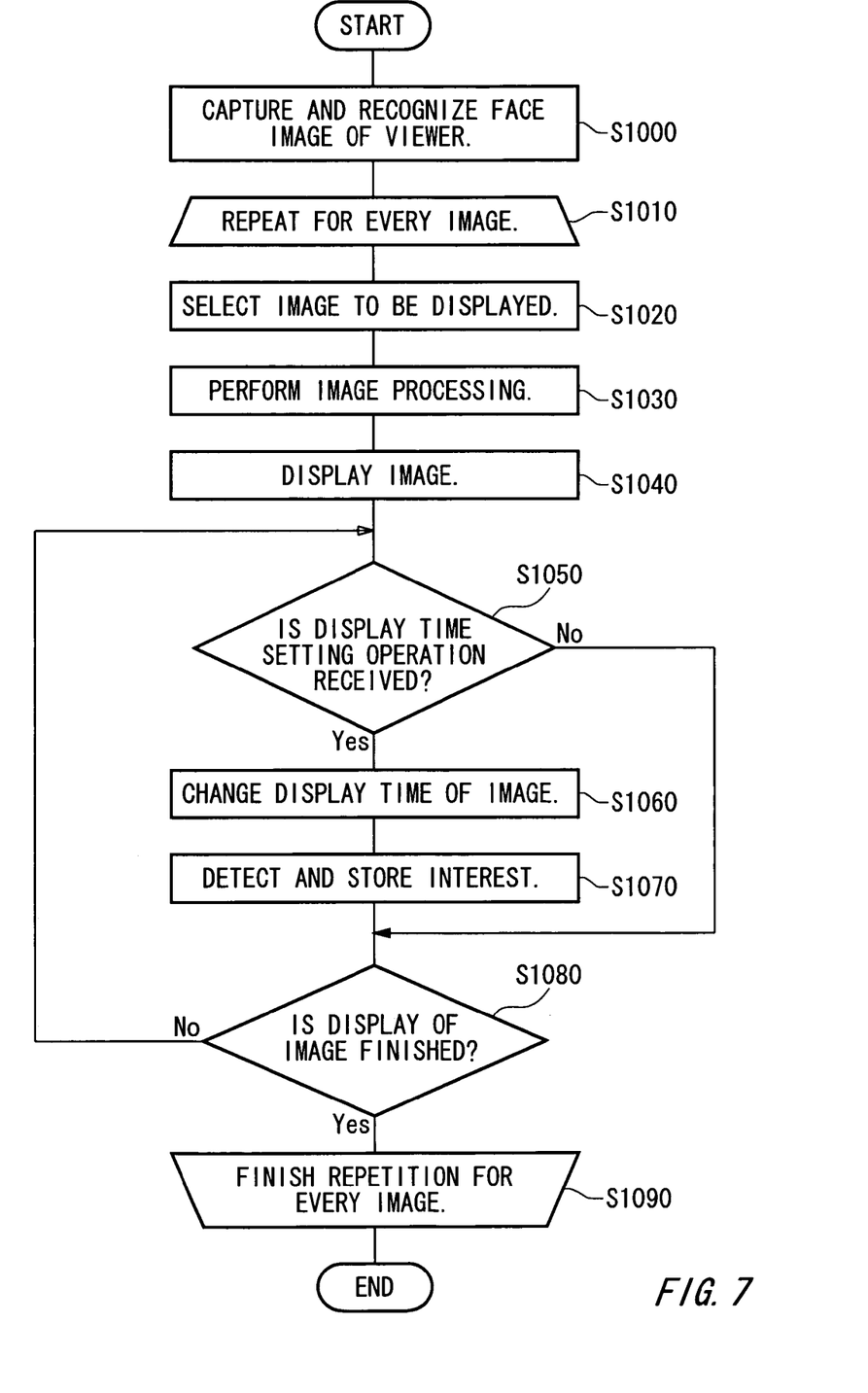
FIG. 7 is a flowchart showing a first example of process flow of the electronic album display system 10 according to the embodiment of the present invention.

FIG. 7 is a flowchart showing a first example of process flow of the electronic album display system 10 according to the embodiment of the present invention. An example in which case such the operation unit 40 of the present example is operated to show a display time of an image which is being displayed is described. First, the image capturing unit 240 captures a face image of the viewer 50. Further, the image recognizing unit 245 recognizes the captured face image and extracts a feature of the face image (S1000).

Then, the electronic album display system 10 repeats the following processes for every image to be displayed (S1010). First, the image selecting unit 220 selects images to be displayed by the image display unit 30 successively out of a plurality of images stored in the image storing unit 215 (S1020). For example, the image selecting unit 220 may detect an image in which the viewer 50 shows an interest stored in the interest storing unit 250 to correspond to the extracted feature of the face image of the viewer 50, the interest being greater than that in other images, and select successively each of images classified as a group including the detected image. Further, the image selecting unit 220 may select images in various ways instead of the above method. For example, the image selecting unit 220 may select successively any images out of the images stored in the image storing unit 215. Further, for example, the image selecting unit 220 may select successively images which are stored in the image storing unit 215 and have been input by the image inputting unit 215 within a predetermined period from now. Further, for example, the image selecting unit 220 may select successively images which have been captured during a period or at a place set by the viewer 50 out of the plurality of images stored in the image storing unit 215. Further, for example, the image selecting unit 220 may make the condition of selecting images in which the viewer 50 shows an interest greater than that in other images narrower on the basis of other restriction. Here, another restriction may be whether an image has been captured during a period or at a place set by the viewer 50, for example. As above, by selecting images under a condition made to be narrower on the basis of restrictions such as image capturing time and image capturing place in addition to the viewer's interest, it is possible to correctly select and display images which the viewer 50 wants to appreciate without displaying images more than necessary even in case a number of images are classified as a group including an image in which the viewer 50 has a great interest.

Then, the image processing unit 225 performs an image processing on the selected image (S1030). Then, the image display unit 30 displays the image (S1040). Then, the operation unit 40 judges whether or not a display time setting operation for setting display time during which the image display unit 30 displays an image is received from the viewer 50 (S1050). Specifically, in case each of the images successively selected by the image selecting unit 220 is switched at a predetermined time interval and displayed, the operation unit 40 judges whether or not an operation for making display time of the image longer or shorter than a predetermined period is received. Here, the display time setting operation may be a pause operation of continuing to display an image which is being displayed, a display time extending operation of extending display time of an image which is being displayed, a skip operation of aborting display of an image which is being displayed and making the next image displayed, and a display time reducing operation of reducing display time of an image which is being displayed.

Then, in case of receiving a display time setting operation for an image (S1050: Yes), the electronic album reproducing unit 20 changes display time of the image on the basis of the display time setting operation (S1060). Then, the interest detecting unit 235 detects an interest of the viewer 50 in the image on the basis of the display time setting operation which the operation unit 40 receives from the viewer 50 (S1070). Specifically, the interest detecting unit 235 detects a greater interest for an image of which display time is set longer by the display time setting operation 0 received by the operation unit 40 out of the plurality of images stored in the image storing unit 215. More specifically, in case the operation unit 40 receives a display time setting operation of making display time of an image longer, the interest detecting unit 235 detects an interest greater than a standard interest in case the operation unit 40 receives no display time setting operation. Further, in case the operation unit 40 receives a display time setting operation of making display time of an image shorter, the interest detecting unit 235 detects an interest less than the standard interest. Then, the interest storing unit 250 stores the interest detected for the image.

Then, the electronic album display system 10 judges whether or not display of the image is finished (S1080). Specifically, the electronic album display system 10 judges whether or not display time of the image has passed since the image display unit 30 started to display the image. Then, in case of not finishing display of the image (S1080: No), the electronic album display system 10 returns to S1050 and makes the operation unit 40 judge again whether or not it receives a display time setting operation. In the mean time, in case of finishing display of the image (S1080: Yes), the electronic album display system 10 repeats the above processes for every image to be displayed (S1090).

According to the electronic album display system 10 of the embodiment of the present invention, the viewer 50 can execute a display time setting operation of setting display time of each image while appreciating images which have been recently captured and input to the electronic album reproducing unit 20 and images selected at random successively. Then, in case of next appreciating images of the electronic album, it is possible to select and display an image of which display time has been set longer and images classified as a group including the image, that is, which have high relevancy to the image. Therefore, only by setting display time of an image which the viewer 50 wants to appreciate longer while appreciating the image, since then, the viewer 50 can make the electronic album display system 10 select the image and an image which has a high relevancy to the image out of the plurality of images included in the electronic album automatically and display them.

Figure 8:
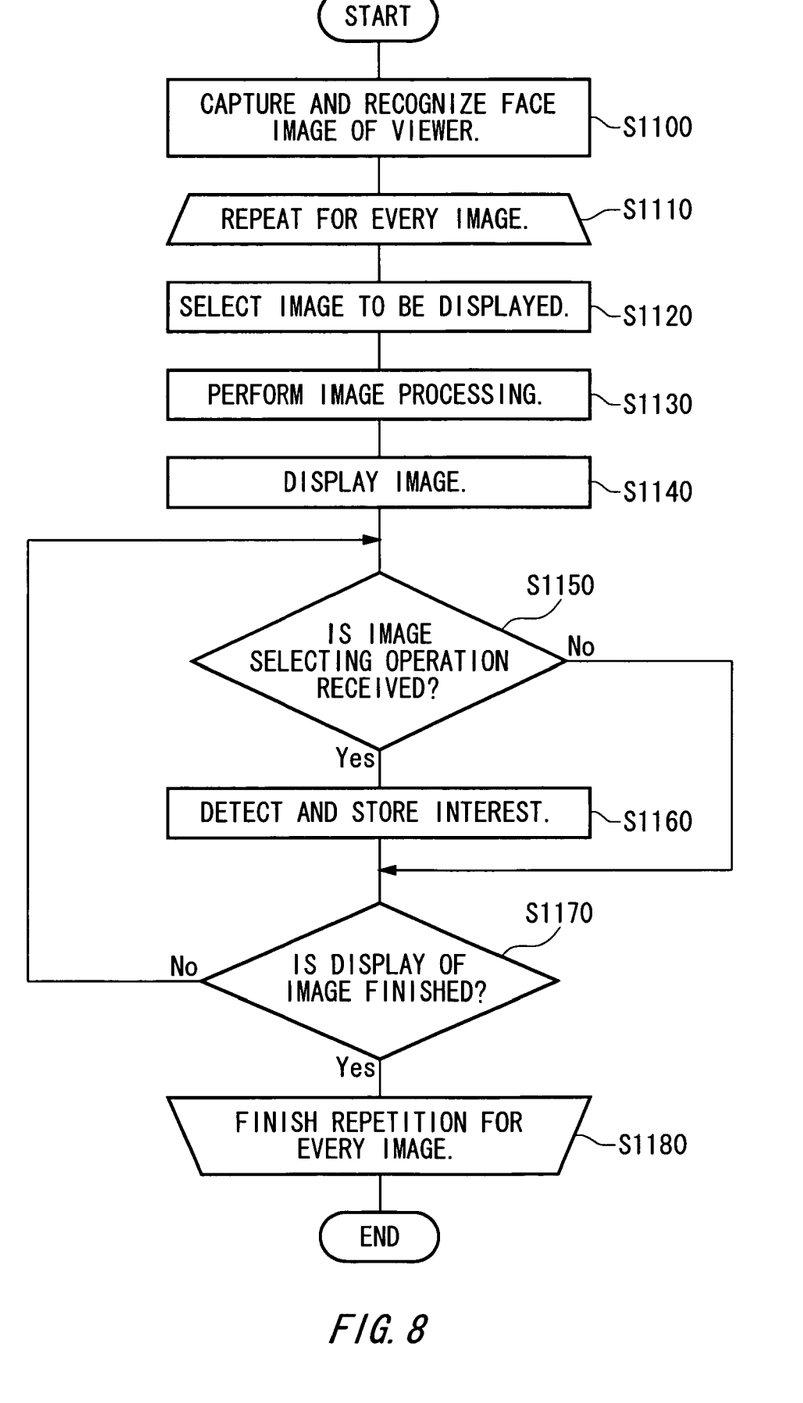
FIG. 8 is a flowchart showing a second example of process flow of the electronic album display system 10 according to the embodiment of the present invention.

FIG. 8 is a flowchart showing a second example of process flow of the electronic album display system 10 according to the embodiment of the present invention. An example in which case such the operation unit 40 of the present example is operated to select an image which is being displayed is described. First, the image capturing unit 240 captures a face image of the viewer 50. Further, the image recognizing unit 245 recognizes the captured face image and extracts a feature of the face image (S1100).

Then, the electronic album display system 10 repeats the following processes for every image to be displayed (S1110). First, the image selecting unit 220 selects images to be displayed by the image display unit 30 successively out of a plurality of images stored in the image storing unit 215 (S1120). Then, the image processing unit 225 performs an image processing on the selected image (S1130). Then, the image display unit 30 displays the image (S1140). Then, the operation unit 40 judges whether or not an image selecting operation for selecting the image is received (S1150). For example, the operation unit 40 judges whether or not the viewer 50 pushes an "image selection button" provided on the operation unit 40 when at least a part of the images successively displayed are being displayed so as to show that he/she has a great interest in the at least a part of the images. Further, the operation unit 40 may receive an evaluating operation for evaluating an image by marking or grading the image as the image selecting operation for selecting the image. Further, the operation unit 40 may receive a display magnification setting operation for setting magnification of display higher when an image is displayed by the image display unit 30 as the image selecting operation for selecting the image.

Then in case of receiving an image selecting operation for an image (S1150: Yes), the interest detecting unit 235 detects an interest of the viewer 50 in the image on the basis of the image selecting operation (S1160). Specifically, the interest detecting unit 235 detects a greater interest for an image which is selected many times by the image selecting operation out of the plurality of images. More specifically, the interest detecting unit 235 increases the number of times the image is selected which is stored in the interest storing unit 250 to correspond to the image identifier of the image. In the meantime, in case of receiving an evaluating operation, the interest detecting unit 235 may detect a greater interest for an image getting a good mark and a good grade by the image evaluating operation out of the plurality of images. Further, in case of receiving a display magnification setting operation, the interest detecting unit 235 may detect a greater interest for an image set to high magnification by the display magnification setting operation out of the plurality of images Then, the electronic album display system 10 judges whether or not display of the image is finished (S1170). In case of not finishing display of the image (S1170: No), the electronic album display system 10 returns to S1150 and makes the operation unit 40 judge again whether or not it receives an image selecting operation. In the mean time, in case of finishing display of the image (S1170: Yes), the electronic album display system 10 repeats the above processes for every image to be displayed (S1180).

According to the electronic album display system 10 of the embodiment of the present invention, the viewer 50 can perform an image selecting operation of selecting an image which is being displayed and an evaluating operation of evaluating an image by grading the image. Further, when the images of the electronic album are next appreciated, it is possible to select and display an image which has been selected many times or has gotten a good mark and a good grade and images classified as a group including the image. Therefore, only by selecting or giving a good grade and a good mark to an image in which the viewer 50 has a great interest while appreciating the image, since then, the viewer 50 can make the electronic album display system 10 select the image and an image which has a high relevancy to the image out of the plurality of images included in the electronic album automatically and display them.

Figure 9:
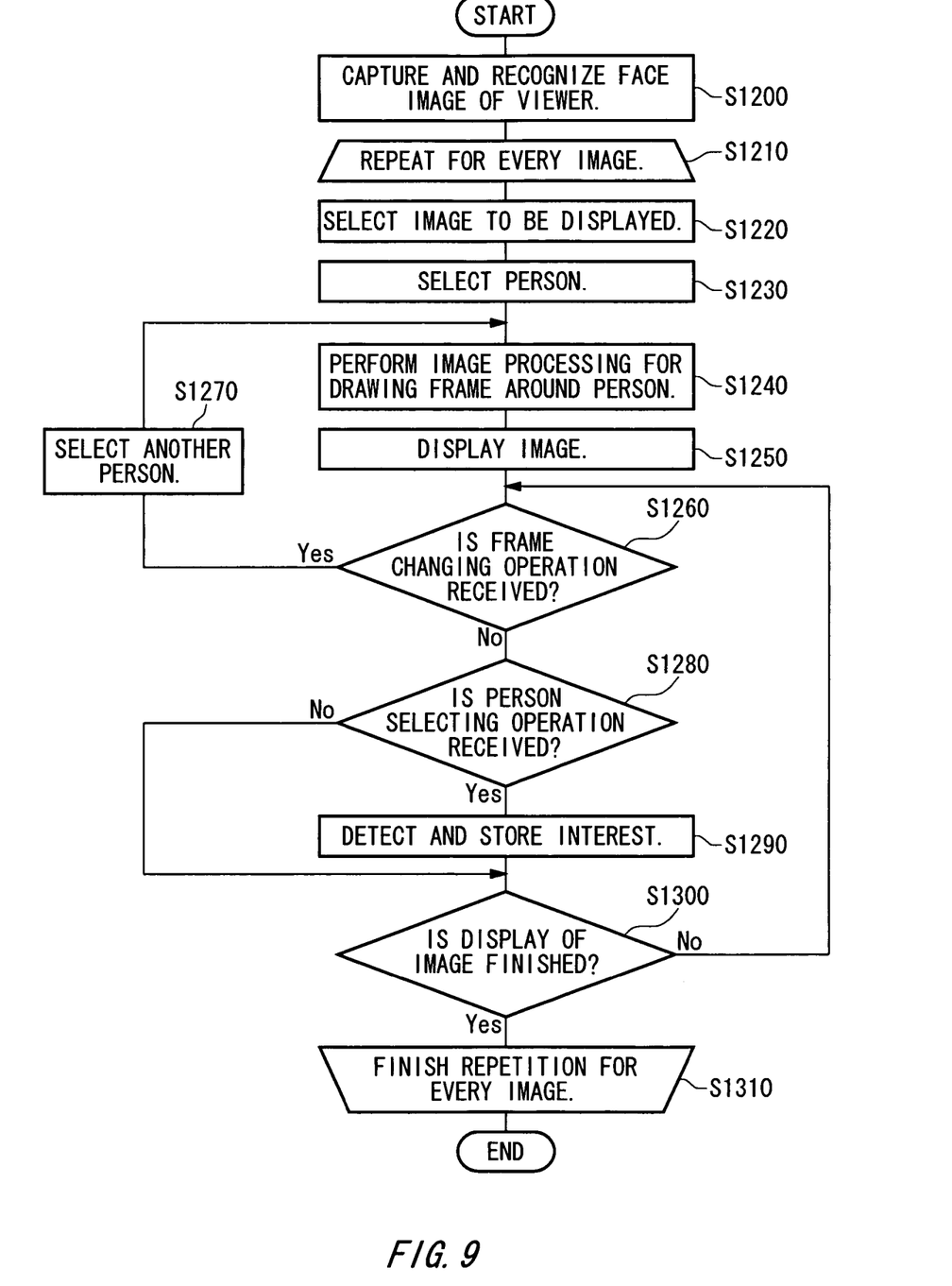
FIG. 9 is a flowchart showing a third example of process flow of the electronic album display system 10 according to the embodiment of the present invention.

FIG. 9 is a flowchart showing a third example of process flow of the electronic album display system 10 according to the embodiment of the present invention. An example of process flow in which case such the operation unit 40 of the present example is operated to select a person included in an image which is being displayed is described. First, the image capturing unit 240 captures a face image of the viewer 50. Further, the image recognizing unit 245 recognizes the captured face image and extracts a feature of the face image (S1200).

Then, the electronic album display system 10 repeats the following processes for every image to be displayed (S1210). First, the image selecting unit 220 selects images to be displayed by the image display unit 30 successively out of a plurality of images stored in the image storing unit 215 (S1220) Then, the image selecting unit 220 selects one person included in an image and outputs information on an area showing the person to the image processing unit 225 (S1230). Then, the image selecting unit 220 may extract information on an area showing the one person from the result of the image classifying unit 210 identifying each of a plurality of persons included in the image. Further, the image selecting unit 220 outputs a person identifier for identifying the person to the interest detecting unit 235. Then, the image processing unit 225 performs an image processing on the image for drawing a frame around the area showing the one person received from the image selecting unit 220 (S1240). Then, the image display unit 30 displays the image on which the frame is drawn around the one person (S1250).

Here, the operation unit 40 judges whether or not a frame changing operation for drawing a frame around a person different from the person is received from the viewer 50 (S1260). For example, the operation unit 40 judges whether or not the viewer 50 pushes a "person change button" provided on the operation unit 40. Then, in case of receiving a frame changing operation for the image (S1260: Yes), the operation unit 40 informs the image selecting unit 220 that a frame should be drawn around a person different from the one person via the communication unit 230 and makes the image selecting unit 220 select the person different from the one person and output information on an area showing the person to the image processing unit 225 (S1270).

In the mean time, in case of not receiving a frame changing operation for the image (S1260: No), the operation unit 40 judges whether or not a person selecting operation for selecting the one person is received (S1280). For example, the operation unit 40 judges whether or not the viewer 50 pushes a "person selection button" provided on the operation unit 40 so as to show that he/she has a great interest in a person around whom no frame is drawn. Then, in case of receiving a person selecting operation (S1280: Yes), the interest detecting unit 235 detects an interest of the viewer 50 in the image stored in the image storing unit 215 on the basis of the person selecting operation (S1290). Specifically, the interest detecting unit 235 detects a greater interest for an image classified as a group of a combination of persons including a person which is selected many times by the person selecting operation out of the plurality of images stored in the image storing unit 215. More specifically, the interest detecting unit 235 outputs a person identifier for identifying the person selected by the person selecting operation which has been received from the image selecting unit 220 to the interest storing unit 250. Then, on the basis of a plurality of person identifiers showing a combination of persons which the image storing unit 215 stores for each group, the interest storing unit 250 detects a group including a person identifier of the selected person and increases an interest stored to correspond to an image classified as the detected group. Instead, the interest storing unit 250 may store the number of times each person, that is, each person identifier, is selected and the image selecting unit 220 may select an image classified as a group corresponding to a combination including a person identifier, wherein the number of times the person identifier is selected stored in the interest storing unit 250 is larger, more frequently.

Then, the electronic album display system 10 judges whether or not display of the image is finished (S1300). Then, in case of not finishing display of the image (S1300: No), the electronic album display system 10 returns to S1260 and makes the operation unit 40 judge again whether or not it receives a frame changing operation. In the mean time, in case of finishing display of the image (S1300: Yes), the electronic album display system 10 repeats the above processes for every image to be displayed (S1310).

According to the electronic album display system 10 of the embodiment of the present invention, the viewer 50 can perform a person selecting operation of selecting a person included in an image which is being displayed. Further, when the images of the electronic album are next appreciated, it is possible to automatically select and display an image including a person which has been selected more frequently.

Figure 10:
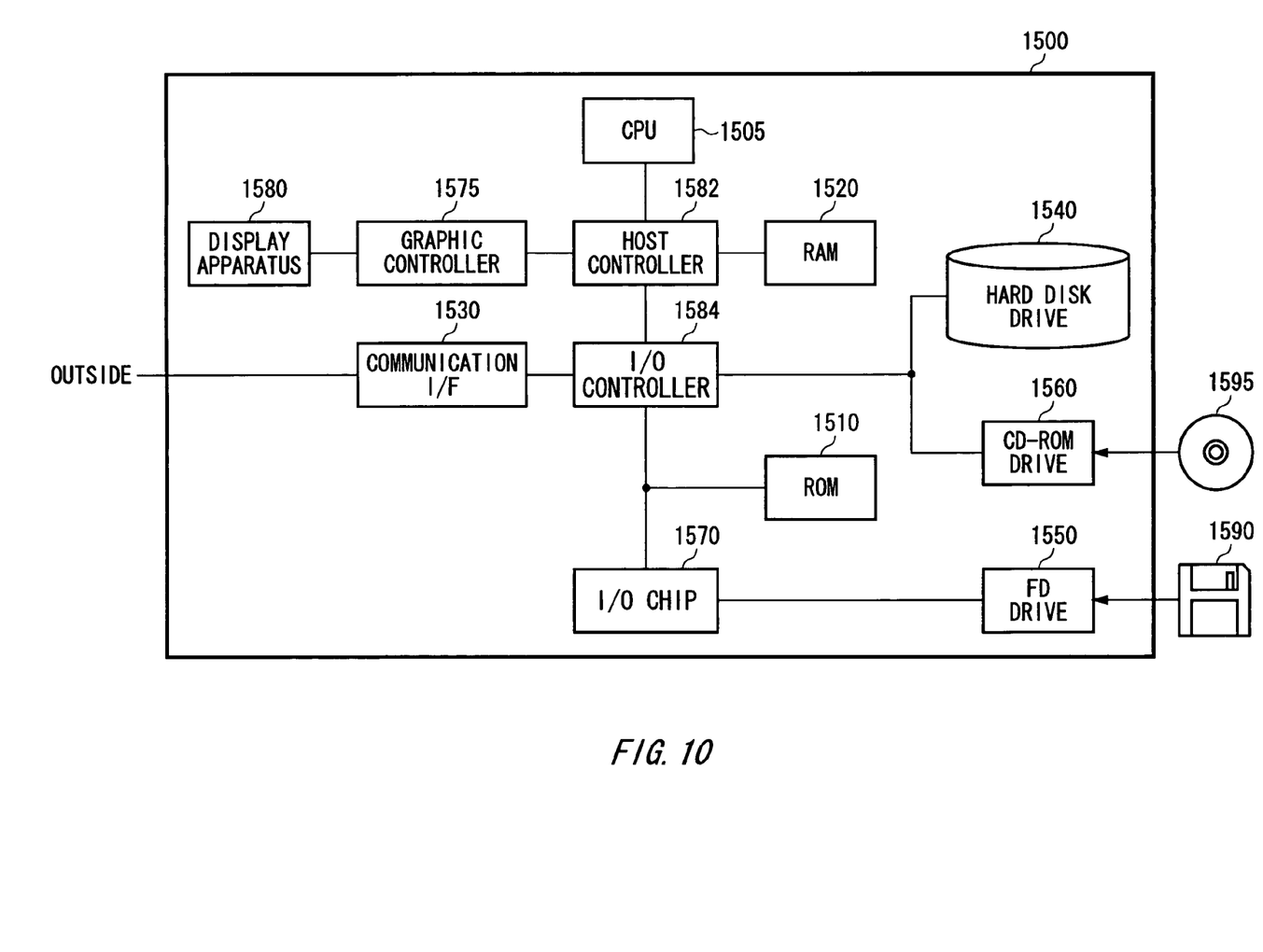
FIG. 10 is a block diagram showing an example of a hardware configuration of a computer 1500 according to the embodiment of the present invention.

FIG. 10 is a block diagram showing an example of a hardware configuration of a computer 1500 according to the embodiment of the present invention. The computer 1500 according to the embodiment of the present invention includes a CPU peripheral part comprising a CPU 1505, a RAM 1520, a graphic controller 1575, and a display apparatus 1580 which are connected with each other by a host controller 1582, an input and output part comprising a communication interface 1530 connected to the host controller 1582 by an input and output controller 1584 ("I/O controller 1584"), a hard disk drive 1540, and a CD-ROM drive 1560, and a legacy input and output part comprising a ROM 1510 connected to the I/O controller 1584, a flexible disk drive 1550, and an input and output chip 1570 ("I/O chip 1570").

The host controller 1582 connects the RAM 1520 with the CPU 1505 having access to the RAM 1520 at a high transmission rate and the graphic controller 1575. The CPU 1505 operates and performs control of each part on the basis of programs stored in the ROM 1510 and the RAM 1520. The graphic controller 1575 acquires image data which is generated on a frame buffer provided in the RAM 1520 by the CPU 1505, etc. and displays it on the display apparatus 1580. Instead, the graphic controller 1575 may include a frame buffer storing an image data generated by the CPU 1505, etc. therein.

The I/O controller 1584 connects the host controller 1582 with the communication interface 1530, which is a relatively high-speed I/O apparatus, the hard disk drive 1540, and the CD-ROM drive 1560. The communication interface 1530 communicates with another apparatus via a network. The hard disk drive 1540 stores a program and data used by the CPU 1505 in the computer 1500. The CD-ROM drive 1560 retrieves a program or data from a CD-ROM 1595 and provides the hard disk drive 1540 with it via the RAM 1520.

Further, the I/O controller 1584 is connected with the ROM 1510 and a relatively low-speed I/O apparatus such as the flexible disk drive 1550 and the I/O chip 1570. The ROM 1510 stores a program executed by the CPU 1500 when the computer 1500 starts to operate, a program depending on the hardware of the computer 1500, and the like. The flexible disk drive 1550 retrieves a program or data from a flexible disk 1590 and provides the hard disk drive 1540 with it via the RAM 1520. The I/O chip 1570 connects the flexible disk drive 1550 with various I/O apparatus via a parallel port, a serial port, a keyboard port, a mouse port, and the like.

An image transmitting program provided to the hard disk drive 1540 via the RAM 1520 is stored in a recording medium such as the flexible disk 1590, the CD-ROM 1595, or an IC-card and provided by a user. The image transmitting program is retrieved from the recording medium, installed on the hard disk drive 1540 in the computer 1500 via the RAM 1520, and executed on the CPU 1505. The image transmitting program installed and executed on the computer 1500 makes the CPU 1505 and the like operate and the computer 1500 function as the image display system 10 or the electronic album reproducing unit 20.

The program described above may be stored in a recording medium of the outside. An optical recoding medium such as a DVD, a PD, etc., a magneto-optical recording medium such as an MD, a tape medium, and a semiconductor memory such as an IC card can be used as the recoding medium in addition to the flexible disk 1590 and the CD-ROM 1595. Further, a storing apparatus such as a hard disk or a RAM provided in a server system connected with a dedicated communication network and internet may be used as the recording medium and may provide the computer 1500 with the program through the network.

Although the present invention has been described by way of exemplary embodiments, it should be understood that those skilled in the art might make many changes and substitutions without departing from the spirit and the scope of the present invention which is defined only by the appended claims.

What is claimed is:

1. An electronic album display system for displaying a plurality of images included in an electronic album comprising:
    an image storing unit for classifying each of the plurality of images into a plurality of groups and storing each of the plurality of images;
    an image selecting unit for selecting an image to be displayed out of the plurality of images;
    an image display unit for displaying the image selected by said image selecting unit;
    an operation unit for receiving a display operation for said image display unit controlled by a viewer when one image included in the plurality of images is being displayed by said image display unit, wherein said operation unit receives a display time setting operation for setting a display time during which the one image is displayed by said image display unit;
    an interest detecting unit for detecting an interest of the viewer in the one image on the basis of the display operation received by said operation unit, wherein said interest detecting unit detects a greater interest for an image of which display time is set longer by the display time setting operation out of the plurality of images; and
    an interest storing unit for storing the interest detected by said interest detecting unit for each of the plurality of images, wherein said image selecting unit selects an image classified in a group including an image in which the viewer has an interest based on the interest stored in said interest storing unit.

2. The electronic album display system as claimed in claim 1, wherein said operation unit receives an image selecting operation for selecting the one image, and said interest detecting unit detects a greater interest for an image selected more frequently by the image selecting operation out of the plurality of images.

3. The electronic album display system as claimed in claim 1 further comprising:
    a face image database for storing face images of a plurality of persons and an image classifying unit for grouping each of the plurality of images by the combination of a plurality of persons included in the image on the basis of each of the face images stored in said face image database and storing each of the plurality of images in said image storing unit.

4. The electronic album display system as claimed in claim 3, wherein said operation unit receives a person selecting operation for selecting at least a part of the plurality of persons included in the one image, and said interest detecting unit detects a greater interest for an image classified in a group having a combination of persons including a person selected more frequently by the person selecting operation out of the plurality of images.

5. The electronic album display system as claimed in claim 3, wherein even in case a first image and a second image included in the plurality of images are different in the combination of persons, said image classifying unit classifies the first and second images as the same group if at least one of image capturing time and image capturing place of the first image shows a difference smaller than a predetermined reference value from that of the second image.

6. The electronic album display system as claimed in claim 1, wherein the interest of the viewer in the one image on the basis of the display operation increases in relation to a frequency of the one image being selected.

7. The electronic album display system as claimed in claim 1, wherein the interest of the viewer in the one image on the basis of the display operation increases if the one image receives a good mark and a good grade.

8. The electronic album display system as claimed in claim 1, wherein the interest of the viewer in the one image on the basis of the display operation increases if the one image is set to a higher magnification.

9. An electronic album display system for displaying a plurality of images included in an electronic album comprising:
    an image storing unit for classifying each of the plurality of images into a plurality of groups and storing each of the plurality of images;

an image selecting unit for selecting an image to be displayed out of the plurality of images;

an image display unit for displaying the image selected by said image selecting unit;

an operation unit for receiving a display operation for said image display unit controlled by a viewer when one image included in the plurality of images is being displayed by said image display unit;

an interest detecting unit for detecting an interest of the viewer in the one image on the basis of the display operation received by said operation unit;

an interest storing unit for storing the interest detected by said interest detecting unit for each of the plurality of images, wherein said image selecting unit selects an image classified in a group including an image in which the viewer has an interest based on the interest stored in said interest storing unit; and an image capturing unit for capturing a face image of the viewer, wherein said interest storing unit stores an interest in each of the plurality of images for each viewer.

10. The electronic album display system as claimed in claim 9, wherein said operation unit receives an image selecting operation for selecting the one image, and said interest detecting unit detects a greater interest for an image selected more frequently by the image selecting operation out of the plurality of images.

11. The electronic album display system as claimed in claim 9 further comprising:

a face image database for storing face images of a plurality of persons and an image classifying unit for grouping each of the plurality of images by the combination of a plurality of persons included in the image on the basis of each of the face images stored in said face image database and storing each of the plurality of images in said image storing unit.

12. The electronic album display system as claimed in claim 11, wherein said operation unit receives a person selecting operation for selecting at least a part of the plurality of persons included in the one image, and said interest detecting unit detects a greater interest for an image classified in a group having a combination of persons including a person selected more frequently by the person selecting operation out of the plurality of images.

13. The electronic album display system as claimed in claim 11, wherein even in case a first image and a second image included in the plurality of images are different in the combination of persons, said image classifying unit classifies the first and second images as the same group if at least one of image capturing time and image capturing place of the first image shows a difference smaller than a predetermined reference value from that of the second image.

14. The electronic album display system as claimed in claim 9, wherein the interest of the viewer in the one image on the basis of the display operation increases in relation to a frequency of the one image being selected.

15. The electronic album display system as claimed in claim 9, wherein the interest of the viewer in the one image on the basis of the display operation increases if the one image receives a good mark and a good grade.

16. The electronic album display system as claimed in claim 9, wherein the interest of the viewer in the one image on the basis of the display operation increases if the one image is set to a higher magnification.

17. A machine readable medium storing thereon a computer program which makes a computer function as an electronic album display system for displaying a plurality of images included in an electronic album, wherein the computer comprises:

an image storing unit for classifying each of the plurality of images into a plurality of groups and storing each of the plurality of images;

an image selecting unit for selecting an image to be displayed out of the plurality of images;

an image display unit for displaying the image selected by said image selecting unit;

an operation unit for receiving a display operation for said image display unit controlled by a viewer when one image included in the plurality of images is being displayed by said image display unit, wherein said operation unit receives a display time setting operation for setting a display time during which the one image is displayed by said image display unit;

an interest detecting unit for detecting an interest of the viewer in the one image on the basis of the display operation received by said operation unit, wherein said interest detecting unit detects a greater interest for an image of which display time is set longer by the display time setting operation out of the plurality of images; and an interest storing unit for storing the interest for each of the plurality of images, and said image selecting unit selects an image classified as a group including an image in which the viewer has an interest based in the interest stored in said interest storing unit.

18. A machine readable medium storing thereon a computer program which makes a computer function as an electronic album display system for displaying a plurality of images included in an electronic album, wherein the computer comprises:

an image storing unit for classifying each of the plurality of images into a plurality of groups and storing each of the plurality of images;

an image selecting unit for selecting an image to be displayed out of the plurality of images;

an image display unit for displaying the image selected by said image selecting unit;

an operation unit for receiving a display operation for said image display unit controlled by a viewer when one image included in the plurality of images is being displayed by said image display unit;

an interest detecting unit for detecting an interest of the viewer in the one image on the basis of the operation received by said operation unit;

an interest storing unit for storing the interest for each of the plurality of images, and said image selecting unit selects an image classified as a group including an image in which the viewer has an interest based in the interest stored in said interest storing unit; and an image capturing unit for capturing a face image of the viewer, wherein said interest storing unit stores an interest in each of the plurality of images for each viewer.

* * * * *